(12) United States Patent
Galford et al.

(10) Patent No.: US 10,386,537 B2
(45) Date of Patent: Aug. 20, 2019

(54) GAMMA-RAY SPECTROMETER CALIBRATION SYSTEMS AND METHODS

(71) Applicant: Halliburton Energy Services, Inc., Houston, TX (US)

(72) Inventors: James E. Galford, Missouri City, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/547,004

(22) PCT Filed: Mar. 26, 2015

(86) PCT No.: PCT/US2015/022710
§ 371 (c)(1),
(2) Date: Jul. 27, 2017

(87) PCT Pub. No.: WO2016/153518
PCT Pub. Date: Sep. 29, 2016

(65) Prior Publication Data
US 2018/0017709 A1    Jan. 18, 2018

(51) Int. Cl.
| | |
|---|---|
| G01T 7/00 | (2006.01) |
| G01V 13/00 | (2006.01) |
| G01T 1/202 | (2006.01) |
| G01T 1/208 | (2006.01) |
| G01V 5/12 | (2006.01) |
| E21B 47/00 | (2012.01) |
| G01T 1/40 | (2006.01) |

(52) U.S. Cl.
CPC ............. *G01V 13/00* (2013.01); *E21B 47/00* (2013.01); *G01T 1/202* (2013.01); *G01T 1/208* (2013.01); *G01T 1/40* (2013.01); *G01T 7/005* (2013.01); *G01V 5/12* (2013.01)

(58) Field of Classification Search
CPC ......... G01V 15/00; G01T 1/202; G01T 1/208; G01T 1/40; E21B 47/00
See application file for complete search history.

(56) References Cited

U.S. PATENT DOCUMENTS

| | | |
|---|---|---|
| 3,270,205 A | 8/1966 | Ladd et al. |
| 3,521,064 A | 7/1970 | Moran et al. |
| 3,714,441 A | 1/1973 | Kreda |
| 3,829,686 A | 8/1974 | Schultz et al. |
| 3,976,878 A | 8/1976 | Chevalier et al. |

(Continued)

FOREIGN PATENT DOCUMENTS

WO    WO 2014/023954 A1    2/2014

OTHER PUBLICATIONS

International Search Report and The Written Opinion of the International Search Authority, or the Declaration, dated Nov. 12, 2015, PCT/US2015/022710, 16 pages, ISA/KR.

(Continued)

*Primary Examiner* — Michael C Bryant
(74) *Attorney, Agent, or Firm* — Haynes and Boone, LLP

(57) ABSTRACT

A gamma-ray spectrometer calibration system comprises a photomultiplier tube and analysis electronics. The photomultiplier tube provides one or more reference signals that are analyzed relative to a spectrum by the analysis electronics to calibrate a gamma-ray spectrometer. Additional apparatus, methods, and systems are disclosed.

14 Claims, 5 Drawing Sheets

(56) References Cited

U.S. PATENT DOCUMENTS

| | | | |
|---|---|---|---|
| 4,031,367 A | | 6/1977 | Murphy |
| 4,220,851 A | | 9/1980 | Whatley, Jr. |
| 4,346,590 A | | 8/1982 | Brown |
| 4,450,354 A | | 5/1984 | Smith, Jr. et al. |
| 5,023,449 A | | 6/1991 | Holenka et al. |
| 5,120,955 A | | 6/1992 | Galford |
| 5,337,323 A | * | 8/1994 | Rokugawa ............ H01S 5/0683 372/29.015 |
| 5,360,975 A | | 11/1994 | Stoller |
| 6,087,656 A | | 7/2000 | Kimmich et al. |
| 7,049,598 B1 | * | 5/2006 | Jordanov ................ G01T 1/208 250/207 |
| 7,202,456 B2 | | 4/2007 | Mickael |
| 2005/0269513 A1 | * | 12/2005 | Ianakiev ................... G01T 1/20 250/362 |
| 2008/0111079 A1 | * | 5/2008 | Stein ......................... G01J 1/02 250/363.01 |
| 2011/0211675 A1 | * | 9/2011 | Ramsden .................. G01T 1/40 378/82 |

OTHER PUBLICATIONS

Kryshkin, et al., "Light Yield Dependence of a Plastic Scintillator Excited With UV Laser and Radioactive Source on Radiation Dose," *Nuclear Instruments and Methods in Physics Research Section A: Accelerators, Spectrometers, Detectors and Associated Equipment*, vol. 381, No. 2-3, Nov. 1, 1996, pp. 573-575.

Stromswold, et al., "Gamma-Ray Spectrum Stabilization in a Borehole Probe Using a Light Emitting Diode," *IEEE Transactions on Nuclear Science*, vol. NS-26, No. 1, Feb. 1979, pp. 395-397.

\* cited by examiner

US 10,386,537 B2

GAMMA-RAY SPECTROMETER CALIBRATION SYSTEMS AND METHODS

The present application is a U.S. National Stage patent application of International Patent Application No. PCT/US2015/022710, filed on Mar. 26, 2015, the benefit of which is claimed and the disclosure of which is incorporated herein by reference in its entirety.

BACKGROUND

Natural gamma-ray elemental concentrations provide information that is valuable for petrophysical purposes. For example, thorium and potassium are useful for mineral identification, especially when combined with other logging measurements. As a further example, zones with high uranium concentrations can be used to identify volcanic zones, and in many organic shale reservoirs, uranium content often correlates with total organic carbon content. Various methods have been developed to derive these elemental concentrations from pulse-height natural gamma-ray spectra. However, deviations from the desired calibration can occur for a variety of reasons. Voltage drifts caused by changes in electronics due to changes in temperature can lead to deviations in both gain and channel offset. Similarly, light output from most scintillation crystals varies with changes in crystal temperature which, in turn, affects the gain of the detector system. In addition, aging of the photomultiplier cathode can cause the spectrometer gain to change over time. For some detector systems a phenomenon known as photomultiplier fatigue occurs when large counting rate changes occur over short intervals of time. In well logging, spectrometers are often operated for long periods of time, and it is not uncommon for the gain to change because of some or all of these effects.

A variety of techniques have been developed in an attempt to compensate for departures from the desired energy scale calibration of gamma-ray spectroscopy measurements. Some conventional techniques involve continuously monitoring the location of a photopeak, requiring that one or more identifiable photopeaks be present in the observed spectra. Other techniques introduce a known source of gamma rays into the detector system to be superimposed on the spectrum produced by gamma rays external to the spectrometer. However, small inaccuracies in determining the known source's location in the spectrum can lead to gain adjustments that magnify errors at larger gamma ray energies. Further, adding chemical sources often creates a number of safety, security, regulatory, and environmental concerns.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

FIGS. 1-6 illustrate example systems and methods for calibration of a gamma-ray spectrometer. A laser (e.g., a low-power semiconductor laser) is located proximate to a light guide of a down-hole gamma-ray spectrometer, so that photons from the laser can be directed to the light-sensitive elements of a photomultiplier tube of the gamma-ray spectrometer to produce reference signals. Analysis electronics analyze the reference signals relative to a spectrum to calculate, and adjust for, gain and channel offset. The analysis electronics may further adjust the current applied to the laser and the voltage applied to the photomultiplier tube to calibrate the gamma-ray spectrometer. In some embodiments, the analysis electronics operate to calibrate the gamma-ray spectrometer by adjusting the power supplied to the laser based on a temperature of the laser, indicated by a sensor proximate to the laser.

In at least one embodiment, the systems and methods allow for calibration of a multichannel pulse-height gamma-ray spectrometer for well logging instruments detecting natural gamma rays or scattered gamma rays as practiced in density logging. In some embodiments, the systems and methods are used for diagnostic measurements performed on the surface at the well site or in a laboratory. Further, in some embodiments the systems and methods are used to calibrate measured pulse-height spectra obtained from gamma-gamma reactions. The systems and methods may be used with instruments for wireline or logging while drilling (LWD) applications.

Figure 1:
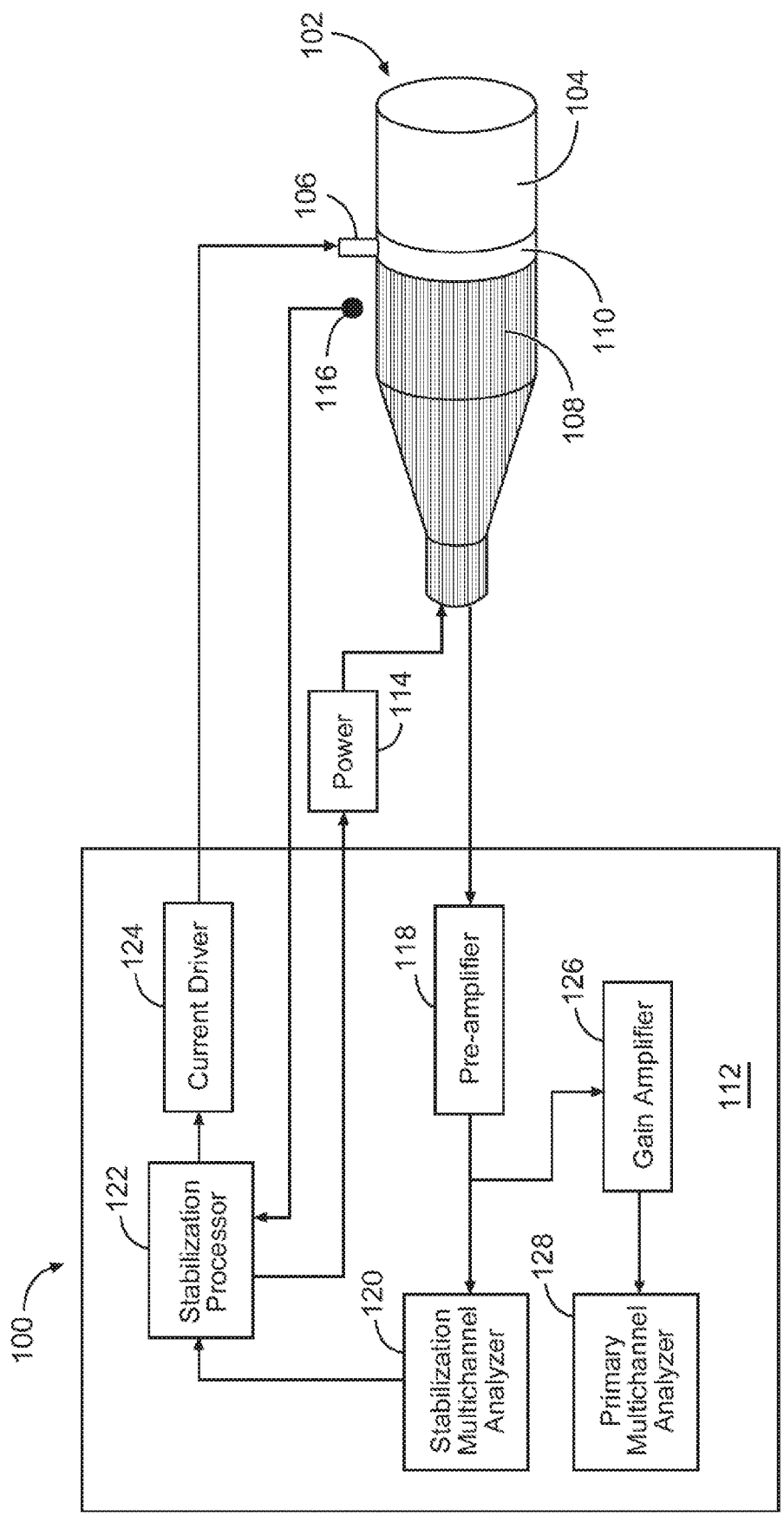
FIG. 1 depicts an example gamma-ray spectrometer calibration system, in accordance with some embodiments.

FIG. 1 depicts an example gamma-ray spectrometer calibration system 100 comprising a gamma-ray spectrometer 102, in accordance with some embodiments. The gamma-ray spectrometer calibration system 100 comprises a scintillation crystal 104, a laser 106, a photomultiplier tube 108, a light guide 110, analysis electronics 112, a power supply 114, and a temperature sensor 116. The scintillation crystal 104 is coupled to the photomultiplier tube 108 via the light guide 110. The light guide 110 provides an optical connection through which photons arising from radiation interactions in the scintillation crystal 104 can be sensed by the light-sensitive photomultiplier tube 108. The laser 106 is located proximate to the light guide 110 (and therefore proximate to the photomultiplier tube 108) such that photons from the laser 106 can also be directed to the light-sensitive elements of the photomultiplier tube 108. In at least one embodiment, the laser 106 is a semiconductor laser, for example a low-power semiconductor laser.

For example, in some embodiments, the laser 106 may comprise one or more low-power class II or class IIIA semiconductor lasers. Laser 106 may be selected based on any of a number of criteria. For example, the wavelength of the light output of the laser 106 should be chosen to match the sensitivity of the photomultiplier tube 108. For example, in at least one embodiment, the laser 106 operates in the 300-500 nanometer range, such as GaN UV (350 nm) or InxGaxN (400-480 nm) blue semiconductor lasers.

Different configurations of the light guide 110 are provided in some embodiments. For example, in at least one embodiment the laser 106 may be embedded within the light guide 110 coupling the scintillation crystal 104 to the photomultiplier tube 108. In some embodiments, the light guide 110 comprises fiber optical light guides embedded in the coupling between the scintillation crystal 104 and the photomultiplier tube 108, such that light from the laser 106 is directed to the light-sensitive components of the photomultiplier tube 108 through the fiber optical light guides.

The laser 106 pulses or otherwise emits light toward the light guide 110 of the gamma-ray spectrometer 102 to induce one or more reference signals. The photomultiplier tube 108 provides the one or more reference signals for the analysis electronics 112 to analyze relative to a spectrum. The analysis electronics 112 operate to calibrate the gamma-ray spectrometer 102 based on the analysis of the reference signals. For example, in at least one embodiment, the analysis electronics 112 operate to calibrate the gamma-ray spectrometer 102 to compensate for changes in gain, changes in offset, or both changes in gain and changes in offset. In at least one embodiment, the analysis electronics 112 operate to calibrate the gamma-ray spectrometer 102 by adjusting power supplied to the laser 106 responsive to a signal provided by the temperature sensor 116 indicating a temperature proximate to the laser 106. In at least one embodiment, the temperature sensor 116 is located proximate to the scintillation crystal 104 to indicate a temperature proximate to the scintillation crystal 104. In some embodiments, the analysis electronics 112 calibrate the gamma-ray spectrometer by adjusting the power supplied to the photomultiplier tube 108 by the power supply 114. The power supply 114 may further supply power to any one or more of the components of the gamma-ray spectrometer calibration system 100.

In at least one embodiment, the analysis electronics 112 comprise a preamplifier 118. The preamplifier 118 processes the signal produced by the photomultiplier tube 108 for processing by a stabilization multichannel analyzer 120. The stabilization multichannel analyzer 120 of the analysis electronics 112 generates a spectrum or spectra based on one or more signals produced by the photomultiplier tube 108 as a result of radiation interactions in the scintillation crystal 104.

The analysis electronics 112 further comprise a stabilization processor 122. The stabilization processor 122 receives the accumulated spectra and the reference signals from the stabilization multichannel analyzer 120 and analyzes the reference signals relative to the one or more spectra. For example, in at least one embodiment, the stabilization processor 122 identifies the location of reference peaks generated by the reference signals to determine gain and channel offset. The stabilization processor 122 controls generation of light pulses from the laser 106 via a current driver 124. In at least one embodiment, the stabilization processor 122 receives a signal from the temperature sensor 116, which indicates a temperature proximate to the laser 106, and adjusts the generation of light pulses from the laser 106 via the current driver 124 based on the signal from the temperature sensor 116. In some embodiments, the stabilization processor 122 adjusts the power supplied to the photomultiplier 108 via the power supply 114. For example, calibration of the gamma-ray spectrometer 102 may comprise adjusting a voltage provided by the power supply 114 to the photomultiplier tube 108. For example, in at least one embodiment, the stabilization processor 118 adjusts the voltage setting according to a function of the observed locations of the reference photopeaks (produced by the photomultiplier tube 108 in response to the light pulses from the laser 106) in the accumulated spectra.

Maintaining calibration under varying operating conditions in some embodiments comprises a closed control loop that includes the stabilization multichannel analyzer 120 (e.g., a stabilization multichannel pulse-height analyzer), the stabilization processor 122, the current driver 124, and the temperature sensor 116. In some embodiments, the closed control loop further comprises the preamplifier 118, such that output pulses from the photomultiplier tube 108 may be directed through the preamplifier 118 to the stabilization multichannel analyzer 120. In at least one embodiment, signals from the preamplifier 118 are passed through a gain amplifier 126 and a primary multichannel analyzer 128. Because the reference photopeaks produce signals that are above the energy range of interest for detected gamma rays, in at least one embodiment, pulse-height spectra for the intended measurement is recorded on an expanded energy scale relative to the stabilization pulse-height spectra. The gain amplifier 126 applies additional gain amplification to the output pulses from the pre-amplifier 118 before they are passed to the primary multichannel analyzer 128. In such a configuration, the signals from the reference photopeaks may exceed the range of the primary multichannel analyzer 128 and would therefore not be counted.

Figure 2:
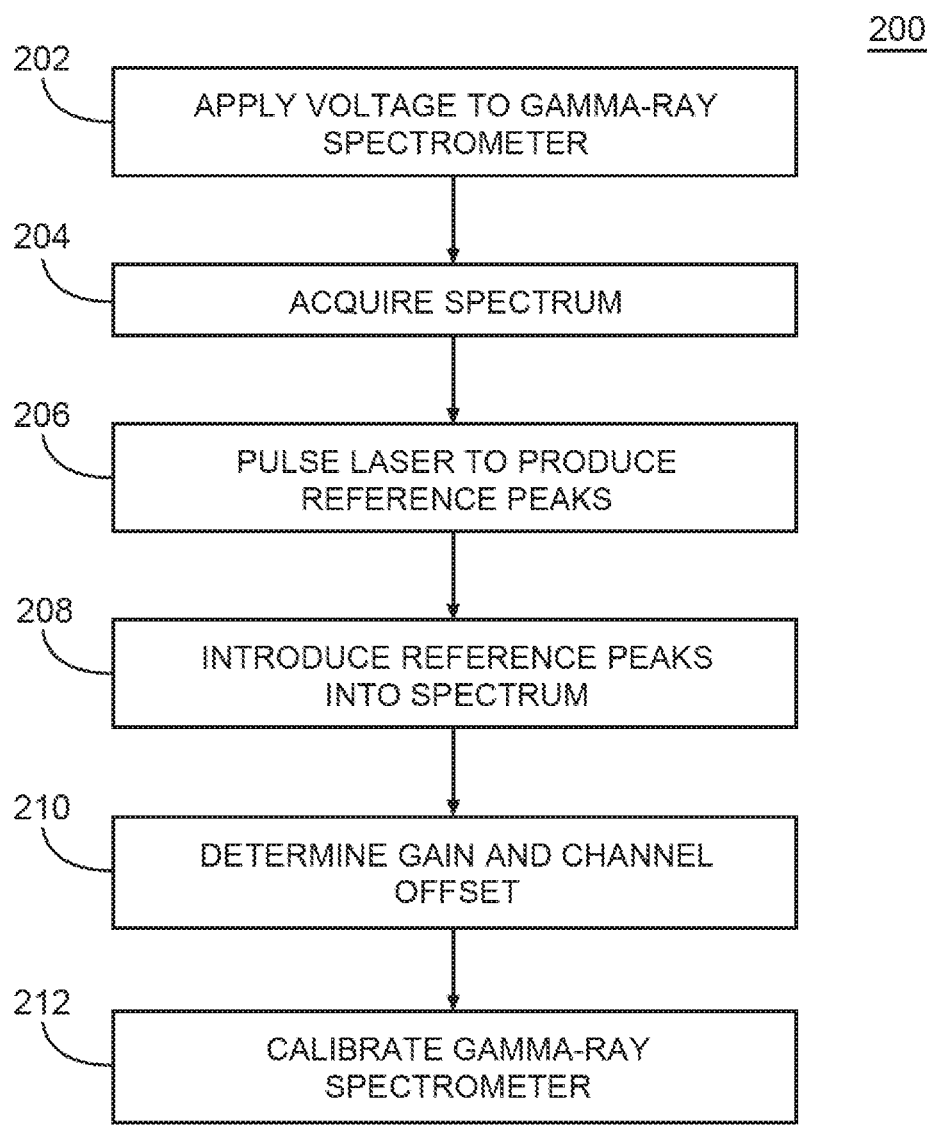
FIG. 2 is a flow diagram of an example method of gamma-ray spectrometer calibration, in accordance with some embodiments.

FIG. 2 is a flow diagram of an example method 200 of gamma-ray spectrometer calibration, in accordance with some embodiments. As a matter of convenience, the method 200 is described with reference to the gamma-ray spectrometer calibration system 100 of FIG. 1.

At block 202, the power supply 114 applies a voltage to the gamma-ray spectrometer 102. In at least one embodiment, the analysis electronics 112 determine an initial voltage setting, for example, a high voltage setting, for the power supply 114 to apply to the photomultiplier tube 108. The analysis electronics 112 can calculate or otherwise determine an initial voltage setting based on empirical data or otherwise, in an effort to minimize the time it takes to calibrate the gamma-ray spectrometer 102 before logging or other operations can proceed.

At block 204, the analysis electronics 112 acquire a spectrum, or spectra. Output signals from the photomultiplier tube 108 are directed through the preamplifier 118 to the stabilization multichannel analyzer 120. In at least one embodiment, the analysis electronics 112 apply further gain amplification to the output signals of the photomultiplier tube 108 by directing the signals from the pre-amplifier 118 through the gain amplifier 126 and the primary multichannel analyzer 128. After the initial voltage setting is applied to the photomultiplier tube 108 of the gamma-ray spectrometer 102, the stabilization multichannel analyzer 120 begins accumulating a pulse-height spectrum associated with an output of the photomultiplier tube 108. In at least one embodiment, the stabilization multichannel analyzer 120 acquires the spectrum by accumulating the pulse-height spectrum for a predetermined spectral accumulation interval.

At block 206, the analysis electronics 112 pulse the laser 106 to produce one or more reference peaks. The analysis electronics 112 may pulse the laser 106 at any time to generate light pulses to induce the reference peaks. For example, in some embodiments, the analysis electronics 112 pulse the laser 106 prior to acquiring the spectrum, prior to applying the initial voltage setting to the photomultiplier tube 108, or concurrently with either or both. The laser 106 produces light pulses without contributing down-scattered background that interferes with the measured spectra. The analysis electronics 112 comprise a current driver 124 to control the current supplied to the laser 106. Using the current driver 124, the analysis electronics 112 can pulse the laser 106 using different currents to generate some of the reference peaks. In at least one embodiment, the current driver 124 pulses the laser 106 according to a pulsing sequence comprising a plurality of current settings to create a plurality of reference photopeaks. In at least one embodiment, the light pulses from the laser 106 are directed toward the light guide 110, such that the light guide such the light guide 110 directs photons from the laser 106 to the light-sensitive elements of the photomultiplier tube 108.

At block 208, the analysis electronics 112 introduce the reference peaks into the spectrum. The stabilization processor 122 processes the accumulated spectra from the stabilization multichannel analyzer 120, and analyzes the one or more reference photopeaks (produced by the photomultiplier tube 108 in response to the light pulses from the laser 106) relative to the spectrum. The analysis electronics 112 select a current for the current driver 124 to supply to the laser 106, such that the reference photopeaks do not interfere with detected gamma rays and the resulting spectra. In at least one embodiment, the reference photopeaks produce signals that are above the energy range of interest for detected gamma rays, and the spectra for the intended measurement is recorded on an expanded energy scale. In at least one embodiment, the reference peaks are measured as part of the accumulated spectrum, and the analysis electronics 112 analyze the accumulated spectrum to locate the reference photopeaks.

At block 210 the analysis electronics 112 determine gain and channel offset based on an analysis of the one or more reference peaks relative to the spectrum. Voltage drifts caused by changes in the electronics with changes in temperature can lead to deviations in both gain and channel offset. The gain can further be affected by changes in temperatures associated with the scintillation crystal 104 or aging of the photomultiplier tube 108. The analysis electronics 112 determine gain change and the channel offset based on the one or more reference peaks associated with the one or more reference signals. In at least one embodiment, the stabilization processor 122 utilizes at least two reference peaks associated with the one or more reference signals to determine the channel offset. In at least one embodiment, the analysis electronics 112 determine the difference between the locations of two reference photopeaks to correspond to an integral factor of the energy/channel spectrometer gain.

At block 212, the analysis electronics 112 operate to calibrate the gamma-ray spectrometer 102 based on the analyses performed by the analysis electronics 112. In at least one embodiment, the analysis electronics 112 calibrate the gamma-ray spectrometer 102 by adjusting parameters of the gamma-ray spectrometer 102 based on the gain change or the channel offset. In some embodiments, the analysis electronics 112 calibrate the gamma-ray spectrometer 102 based on the change in gain and the channel offset. In at least one embodiment, the analysis electronics 112 adjust the voltage applied to the photomultiplier tube 108 to alter the location of the one or more reference peaks within the spectrum.

In some embodiments, the analyses performed by the analysis electronics 112 include measuring a temperature of the laser 106 via the temperature sensor 116. Threshold current of the laser 106 increases with increased temperature (as illustrated below, with reference to FIG. 3). As such, in some embodiments, the analysis electronics 112 further calibrate the gamma-ray spectrometer 102 by correcting the current supplied to the laser 106, via the current driver 124, based on the measured temperature determined by the temperature sensor 116. In at least one embodiment, the gamma-ray spectrometer calibration system 100 automatically calibrates the gamma-ray spectrometer 102 to compensate for gradual changes in gain, channel offset, temperature, or a combination of these, that may lead to inaccuracies in measurements.

Figure 3:
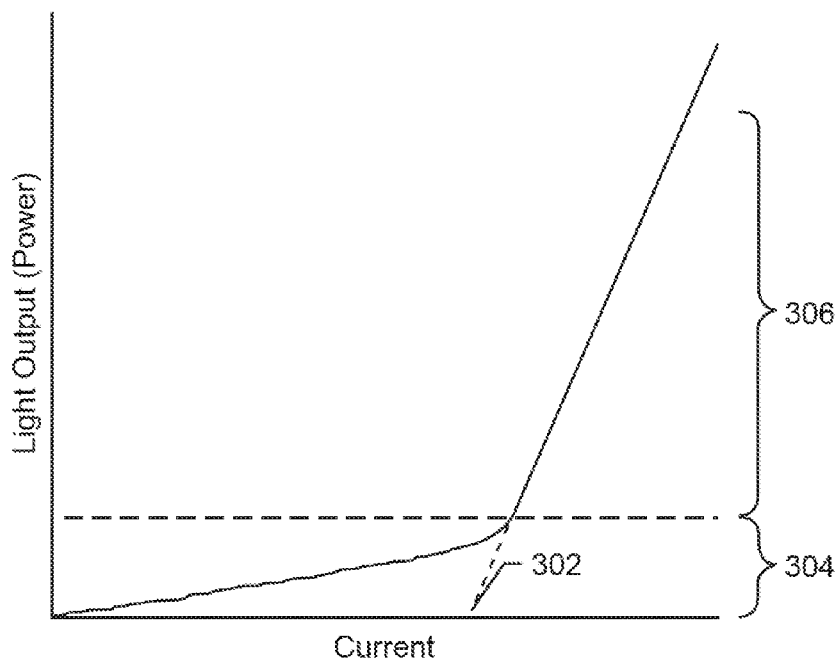
FIG. 3 is a graph indicating example light output of a laser relative to current supplied, in accordance with some embodiments.

FIG. 3 is a graph indicating example light output of a laser (such as the laser 106 of the gamma-ray spectrometer calibration system 100 of FIG. 1) relative to current supplied, in accordance with some embodiments. The stabilization processor 122 of the analysis electronics 112 controls the emission of light pulses from the laser 106 via the current driver 124. The intensity of the light output of the laser 106 is controlled by the current applied by the current driver 124 after a threshold current 302 is exceeded. When operated below the threshold current level, the laser 106 produces spontaneous, incoherent light emissions 304 much like light-emitting diodes. In at least one embodiment, the gamma-ray spectrometer calibration system 100 operates the laser 106 via the current driver 124 at a current above the threshold current 302. That is, the analysis electronics 112 operate the laser 106 in coherent emission mode 306, such that the output light intensity is linearly proportional to the applied current. In at least one embodiment, the analysis electronics 112 determine a pulsing sequence comprising a plurality of current settings above the threshold current 302. The plurality of current settings of the pulsing sequence generate a sequence of light pulses, creating a plurality of reference photopeaks in the spectra accumulated by the stabilization multichannel analyzer 120 to aid in calibration of the gamma-ray spectrometer 102.

Figure 4:
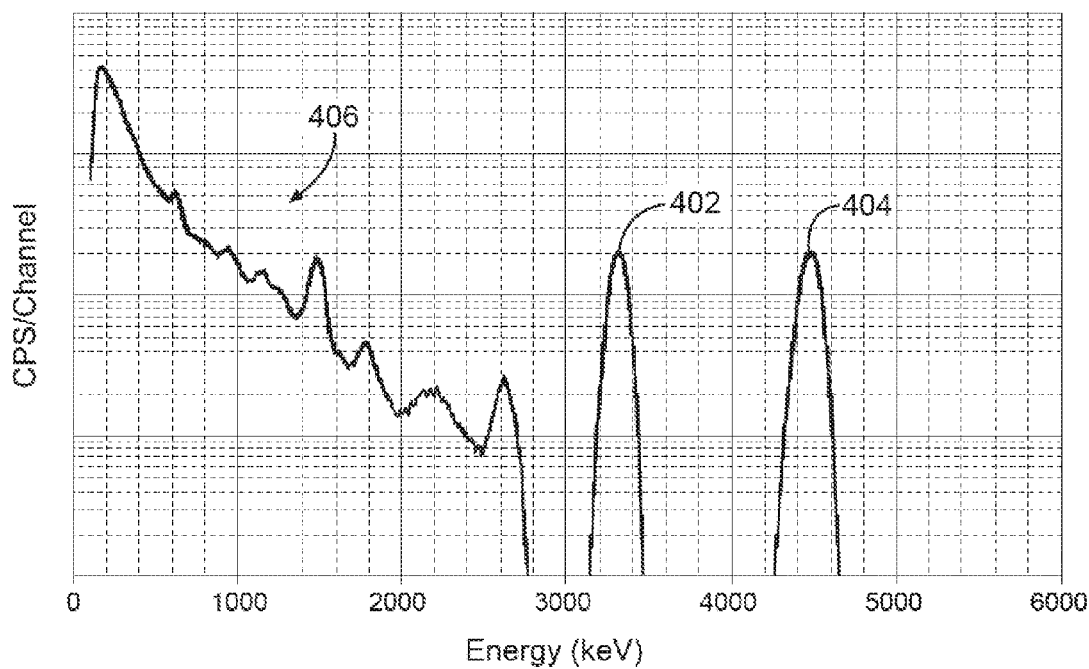
FIG. 4 is an example of a pulse-height spectrum indicating reference signals produced by a gamma-ray spectrometer calibration system, in accordance with some embodiments.

FIG. 4 is an example of a pulse-height spectrum indicating reference signals produced by a gamma-ray spectrometer calibration system (such as the gamma-ray spectrometer calibration system 100 of FIG. 1), in accordance with some embodiments. The gamma-ray spectrometer calibration system 100 generates reference signals via pulsing of the laser 106, such that the corresponding reference photopeaks 402, 404 do not interfere with the spectra of detected gamma rays 406. The analysis electronics 112 control the output light intensity of the laser 106 via the current driver 124, such that the light intensity associated with the reference photopeaks 402, 404 exceeds the expected energy domain of detected gamma rays 406. Conventional sources of reference signals result in down-scattered gamma rays, creating a background that interferes with the desired measured spectra. In contrast, the light pulses of the laser 106 in most embodiments create the reference photopeaks 402, 404 without contributing to the down-scattered background.

In at least one embodiment, since the reference photopeaks 402, 404 produce signals that are above the energy range of interest for detected gamma rays, the analysis electronics 112 record pulse-height spectra for the intended measurement on an expanded energy scale relative to the spectra recorded by the stabilization multichannel analyzer 120 and processed by the stabilization processor 122. Thus, in some embodiments, additional gain amplification may be applied (via the gain amplifier 126) to the output pulses from the pre-amplifier 118 before they are passed to the primary multichannel analyzer 128. In such a configuration, the signals from the reference photopeaks 402, 404 may exceed the range of the primary multichannel analyzer 128 and they would therefore not be counted. In at least one embodiment, two reference photopeaks 402, 404 are produced such that a complete, dynamic calibration of the gamma-ray spectrometer 102, i.e., gain and channel offset, is achieved through a feedback connection between the stabilization processor 122 and the stabilization multichannel analyzer 120.

Figure 5:
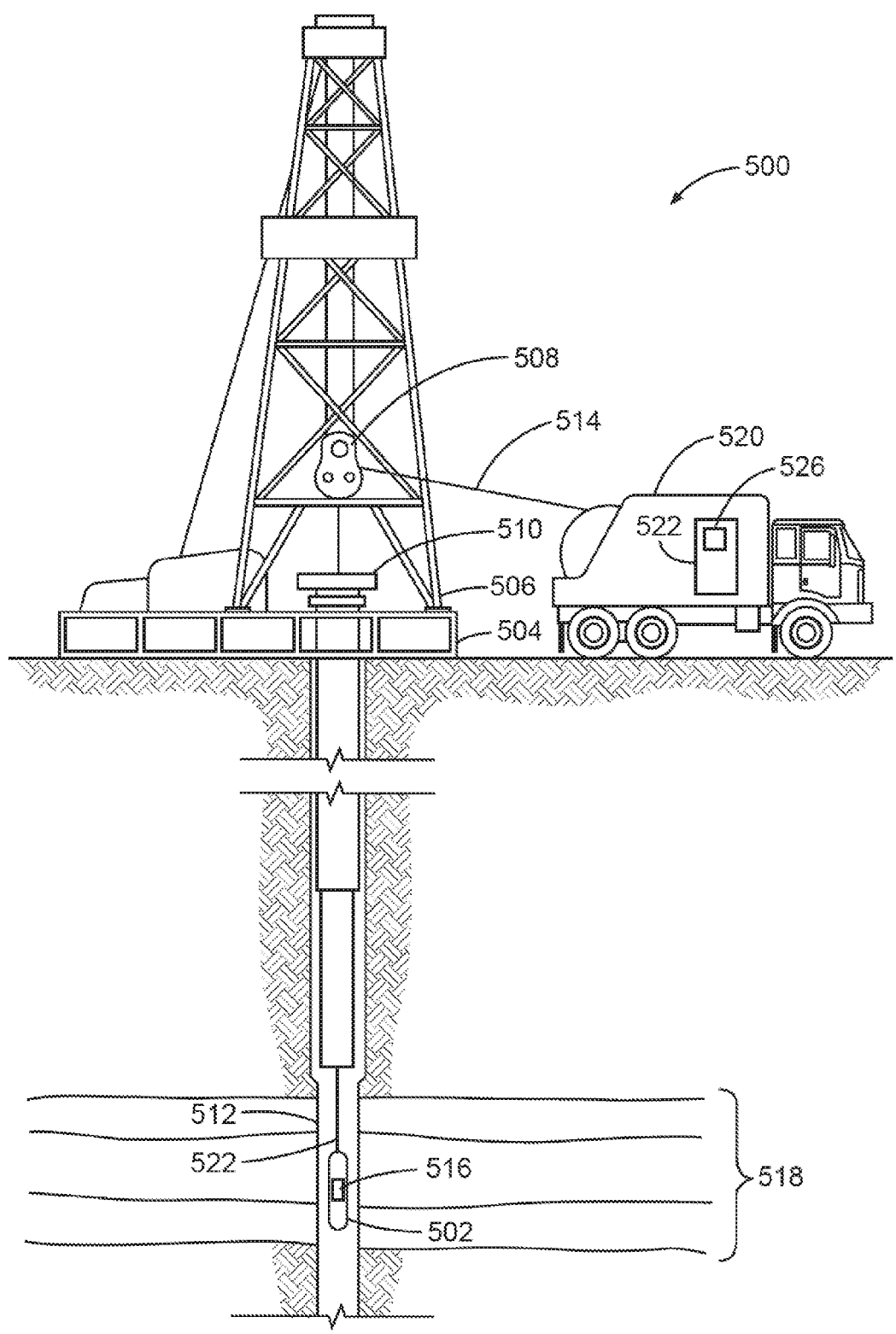
FIG. 5 depicts an example system at a wireline site, in accordance with some embodiments.
Figure 6:
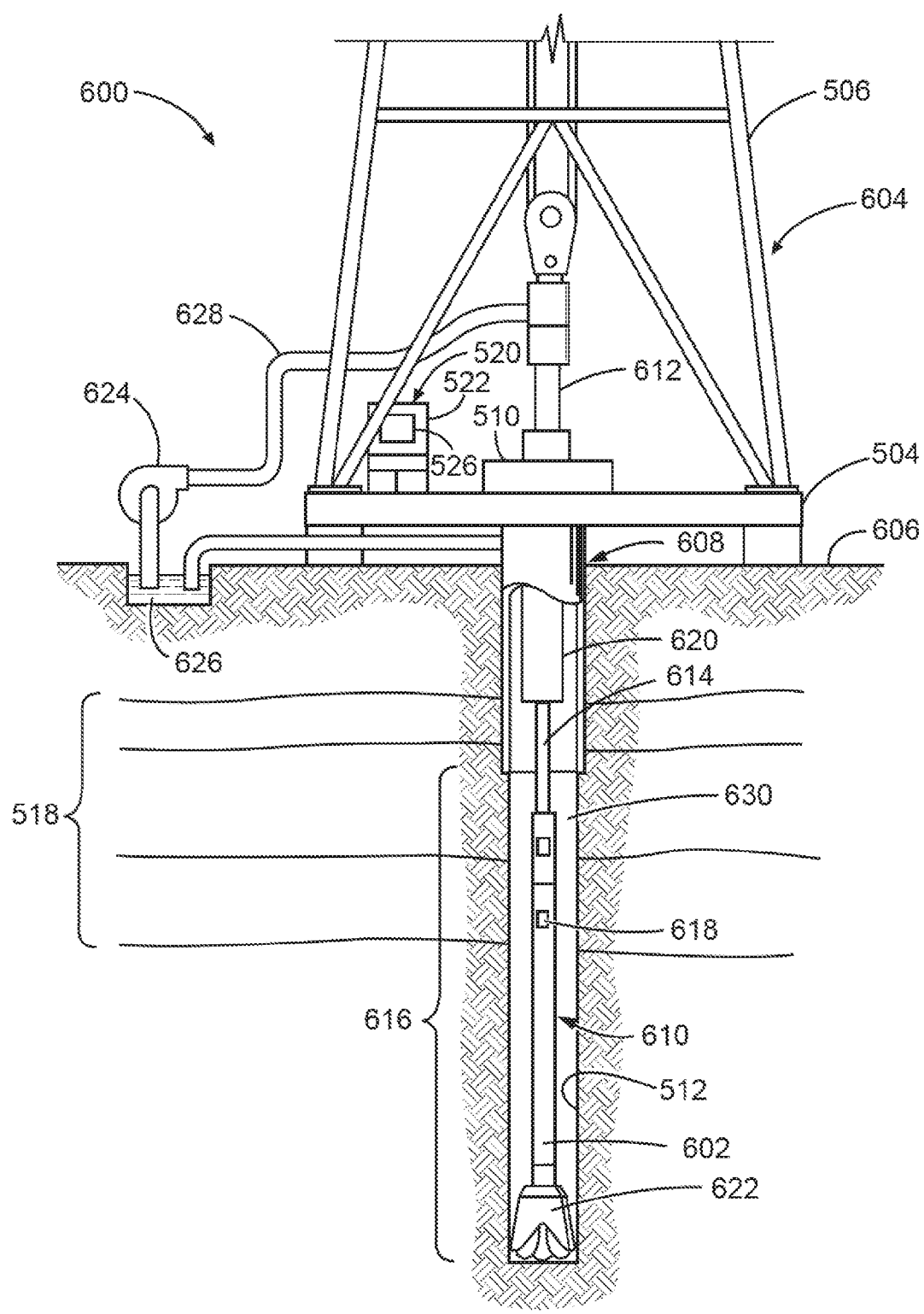
FIG. 6 depicts an example system at a drilling site, in accordance with some embodiments.

FIG. 5 is a diagram showing a wireline system 500 embodiment, and FIG. 6 is a diagram showing a logging while drilling (LWD) system 600 embodiment. The systems 500, 600 may thus comprise portions of a wireline logging tool body 502 as part of a wireline logging operation, or of a down hole tool 602 as part of a down hole drilling operation.

FIG. 5 illustrates a well used during wireline logging operations. In this case, a drilling platform 504 is equipped with a derrick 506 that supports a hoist 508. Drilling oil and gas wells is commonly carried out using a string of drill pipes connected together so as to form a drillstring that is lowered through a rotary table 510 into a wellbore or borehole 512. Here it is assumed that the drillstring has been temporarily removed from the borehole 512 to allow a wireline logging tool body 502, such as a probe or sonde, to be lowered by wireline or logging cable 514 (e.g., slickline cable) into the borehole 512. Typically, the wireline logging tool body 502 is lowered to the bottom of the region of interest and subsequently pulled upward at a substantially constant speed. The tool body 502 may include gamma-ray spectrometer calibration system 516 (which may include any one or more of the elements of FIG. 1).

During the upward trip, at a series of depths various instruments (e.g., the gamma-ray spectrometer calibration system 516 included in the tool body 502) may be used to perform measurements on the subsurface geological formations 518 adjacent to the borehole 512 (and the tool body 502). The measurement data can be communicated to a surface logging facility 520 for processing, analysis, and/or storage. The processing and analysis may include natural gamma-ray spectroscopy measurements and/or determination of formation density. The logging facility 520 may be provided with electronic equipment for various types of signal processing, which may be used by any one or more of the components of the gamma-ray spectrometer calibration system 516. Similar formation evaluation data may be gathered and analyzed during drilling operations (e.g., during LWD/MWD (measurement while drilling) operations, and by extension, sampling while drilling).

In some embodiments, the tool body 502 is suspended in the wellbore by a wireline cable 514 that connects the tool to a surface control unit (e.g., comprising a workstation 522). The tool may be deployed in the borehole 512 on coiled tubing, jointed drill pipe, hard wired drill pipe, or any other suitable deployment technique.

Referring to FIG. 6, it can be seen how a system 600 may also form a portion of a drilling rig 604 located at the surface 606 of a well 608. The drilling rig 604 may provide support for a drillstring 610. The drillstring 610 may operate to penetrate the rotary table 510 for drilling the borehole 512 through the subsurface formations 518. The drillstring 610 may include a Kelly 612, drill pipe 614, and a bottom hole assembly 616, perhaps located at the lower portion of the drill pipe 614. As can be seen in the figure, the drillstring 610 may include a gamma-ray spectrometer calibration system 618 (which may include any one or more of the elements of FIG. 1).

The bottom hole assembly 616 may include drill collars 620, a down hole tool 602, and a drill bit 622. The drill bit 622 may operate to create the borehole 512 by penetrating the surface 606 and the subsurface formations 518. The down hole tool 602 may comprise any of a number of different types of tools including MWD tools, LWD tools, and others.

During drilling operations, the drillstring 610 (perhaps including the Kelly 612, the drill pipe 614, and the bottom hole assembly 616) may be rotated by the rotary table 510. Although not shown, in addition to, or alternatively, the bottom hole assembly 616 may also be rotated by a motor (e.g., a mud motor) that is located down hole. The drill collars 620 may be used to add weight to the drill bit 622. The drill collars 620 may also operate to stiffen the bottom hole assembly 616, allowing the bottom hole assembly 616 to transfer the added weight to the drill bit 622, and in turn, to assist the drill bit 622 in penetrating the surface 606 and subsurface formations 518.

During drilling operations, a mud pump 624 may pump drilling fluid (sometimes known by those of ordinary skill in the art as "drilling mud") from a mud pit 626 through a hose 628 into the drill pipe 614 and down to the drill bit 622. The drilling fluid can flow out from the drill bit 622 and be returned to the surface 606 through an annular area 630 between the drill pipe 614 and the sides of the borehole 512. The drilling fluid may then be returned to the mud pit 626, where such fluid is filtered. In some embodiments, the drilling fluid can be used to cool the drill bit 622, as well as to provide lubrication for the drill bit 622 during drilling operations. Additionally, the drilling fluid may be used to remove subsurface formation cuttings created by operating the drill bit 622.

The workstation 522 and the controller 526 may include modules comprising hardware circuitry, a processor, and/or memory circuits that may store software program modules and objects, and/or firmware, and combinations thereof, as desired by the architect of the gamma-ray spectrometer calibration system 516, 618 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

In some embodiments, a system comprises a gamma-ray spectrometer; a laser proximate to the gamma-ray spectrometer to generate light pulses to induce one or more reference signals; and analysis electronics electrically coupled to the gamma-ray spectrometer, the analysis electronics to: analyze the one or more reference signals relative to a spectrum; and calibrate the gamma-ray spectrometer based on analysis of the one or more reference signals.

In some embodiments, the analysis electronics are to calibrate the gamma-ray spectrometer to compensate for changes in gain.

In some embodiments, the analysis electronics are further to calibrate the gamma-ray spectrometer to compensate for channel offset.

In some embodiments, the laser comprises a semiconductor laser.

In some embodiments, a system further comprises a temperature sensor proximate to the laser, wherein the analysis electronics are operative to adjust the power to the laser responsive to a signal provided by the temperature sensor.

In some embodiments, the gamma-ray spectrometer comprises: a scintillation crystal; and a photomultiplier tube optically coupled to the scintillation crystal, wherein the photomultiplier tube is to detect photons from the scintillation crystal.

In some embodiments, a system further comprises a light guide coupled to the scintillation crystal, wherein the light guide is to direct photons to the photomultiplier tube.

In some embodiments, the laser is embedded in a light guide; and the light guide is to direct photons from the laser to the photomultiplier tube.

In some embodiments, the analysis electronics comprise: a stabilization multichannel analyzer to generate the spectrum based on a signal produced by the photomultiplier; and a stabilization processor to analyze the one or more reference signals relative to the spectrum generated by the stabilization multichannel analyzer.

In some embodiments, the analysis electronics further comprise a preamplifier to process the signal produced by the photomultiplier for processing by the stabilization multichannel analyzer.

In some embodiments, the analysis electronics further comprise a gain amplifier to amplify output pulses from the preamplifier.

In some embodiments, the analysis electronics further comprise a current driver to control the generation of light pulses from the laser.

In some embodiments, a system further comprises a power supply to supply power to a photomultiplier tube, wherein the analysis electronics are to calibrate the gamma-ray spectrometer by adjusting the power supplied by the power supply.

In some embodiments, a method comprises generating light pulses with a laser to induce one or more reference signals in a spectrum; and calibrating a gamma-ray spectrometer based on an analysis of the one or more reference signals relative to a spectrum.

In some embodiments, the method further comprises determining a gain change based on the one or more reference signals, wherein calibrating the gamma-ray spectrometer comprises adjusting parameters of the gamma-ray spectrometer based on the gain change.

In some embodiments, a method further comprises determining a channel offset based on at least two reference peaks resulting from the one or more reference signals, wherein calibrating the gamma-ray spectrometer further comprises adjusting parameters of the gamma-ray spectrometer based on the channel offset.

In some embodiments, a method comprises applying voltage to a photomultiplier tube of a gamma-ray spectrometer; acquiring a spectrum associated with an output from the photomultiplier tube; analyzing the spectrum at a stabilization multichannel analyzer; pulsing a laser to produce one or more reference peaks; introducing the one or more reference peaks into the spectrum; adjusting the voltage applied to the photomultiplier tube to alter the location of the one or more reference peaks within the spectrum.

In some embodiments, pulsing the laser comprises pulsing the laser using different currents to generate some of the reference peaks.

In some embodiments, a method further comprises measuring a temperature of the laser as a measured temperature; and correcting the current supplied to the laser based on the measured temperature.

In some embodiments, a method further comprises determining a change in gain based on the one or more reference peaks; and determining a channel offset based on at least two of the one or more reference peaks.

In some embodiments, a method further comprises calibrating the gamma-ray spectrometer based on the change in gain and the channel offset.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system, comprising:
   a gamma-ray spectrometer;
   a laser proximate to the gamma-ray spectrometer to generate light pulses to induce one or more reference signals;
   a temperature sensor proximate to the laser; and
   analysis electronics electrically coupled to the gamma-ray spectrometer, the analysis electronics configured to:
      analyze the one or more reference signals relative to a spectrum;
      calibrate the gamma-ray spectrometer based on analysis of the one or more reference signals; and
      adjust power to the laser responsive to a signal provided by the temperature sensor.

2. The system of claim 1, wherein the analysis electronics are configured to calibrate the gamma-ray spectrometer to compensate for changes in gain.

3. The system of claim 2, wherein the analysis electronics are configured further to calibrate the gamma-ray spectrometer to compensate for channel offset.

4. The system of claim 1, wherein the laser comprises a semiconductor laser.

5. The system of claim 1, wherein the gamma-ray spectrometer comprises:
   a scintillation crystal; and
   a photomultiplier tube optically coupled to the scintillation crystal, wherein the photomultiplier tube is configured to detect photons from the scintillation crystal.

6. The system of claim 5, further comprising a light guide coupled to the scintillation crystal, wherein the light guide is configured to direct photons to the photomultiplier tube.

7. The system of claim 5, wherein the analysis electronics comprise:
   a stabilization multichannel analyzer configured to generate the spectrum based on a signal produced by the photomultiplier; and
   a stabilization processor configured to analyze the one or more reference signals relative to the spectrum generated by the stabilization multichannel analyzer.

8. The system of claim 7, wherein the analysis electronics further comprise a preamplifier configured to process the signal produced by the photomultiplier for processing by the stabilization multichannel analyzer.

9. The system of claim 8, wherein the analysis electronics further comprise a gain amplifier configured to amplify output pulses from the preamplifier.

10. The system of claim 1, wherein:
    the laser is embedded in a light guide; and
    the light guide is configured to direct photons from the laser to the photomultiplier tube.

11. The system of claim 1, wherein the analysis electronics further comprise a current driver configured to control the generation of light pulses from the laser.

12. A method, comprising:
    generating light pulses with a laser to induce one or more reference signals in a spectrum;
    calibrating a gamma-ray spectrometer based on an analysis of the one or more reference signals relative to a spectrum; and
    adjusting power to the laser responsive to a signal provided by a temperature sensor proximate the laser.

13. The method of claim 12, further comprising:
    determining a gain change based on the one or more reference signals, wherein calibrating the gamma-ray spectrometer comprises adjusting parameters of the gamma-ray spectrometer based on the gain change.

14. The method of claim 13, further comprising:
    determining a channel offset based on at least two reference peaks resulting from the one or more reference signals, wherein calibrating the gamma-ray spectrometer further comprises adjusting parameters of the gamma-ray spectrometer based on the channel offset.

* * * * *